United States Patent [19]

Hill

[11] Patent Number: 5,234,325
[45] Date of Patent: Aug. 10, 1993

[54] APPARATUS FOR WINDSHIELD GLASS REPAIR

[76] Inventor: Elgie Hill, Rte. 1 Box 1210, Cuba, Mo. 65453

[21] Appl. No.: 862,057

[22] Filed: Apr. 2, 1992

[51] Int. Cl.$^5$ .................. B29C 29/04; B32B 35/00
[52] U.S. Cl. .................................. 425/12; 65/28; 156/94; 264/36; 425/13
[58] Field of Search ............ 425/11, 12, 13; 264/36; 156/94, 98, 382; 427/140; 65/28

[56] References Cited

U.S. PATENT DOCUMENTS

| | | | |
|---|---|---|---|
| 3,562,366 | 2/1971 | Sohe | 425/13 |
| 4,200,478 | 4/1980 | Jacino et al. | 264/36 |
| 4,681,520 | 7/1987 | Birkhauser | 425/12 |
| 4,775,305 | 10/1988 | Alexander et al. | 425/13 |
| 4,814,185 | 3/1989 | Jones | 425/13 |
| 4,954,300 | 9/1990 | Dotson | 264/36 |
| 4,961,883 | 10/1990 | Jacino et al. | 425/13 |
| 4,975,037 | 12/1990 | Freiheit | 425/13 |
| 4,995,798 | 2/1991 | Ameter | 425/12 |
| 5,069,836 | 12/1991 | Werner et al. | 264/36 |
| 5,104,304 | 4/1992 | Dotson | 150/94 |

Primary Examiner—Khanh P. Nguyen
Attorney, Agent, or Firm—Robbins & Robbins

[57] ABSTRACT

Apparatus for windshield glass repair is provided. A cylinder having internal chambers is equipped with a piston head plunger at a top end and has a mounting device at a bottom end for securing a tight seal over a crack in a windshield. The withdrawal of the plunger creates a vacuum and allows for air to be pulled out of the crack, while a side stem in communication with the cylinder allows resin filler material to be introduced and forced into the crack. Air pressure is equalized by opening the side stem, whereupon the plunger can be depressed to force the resin filler into the crack. The mounting supports allow for quick connect and disconnect of the cylinder. The side stem obviates the necessity of removing the cylinder for re-filling of resin material whereby any length crack can be repaired without breaking the tight seal on the crack.

11 Claims, 2 Drawing Sheets

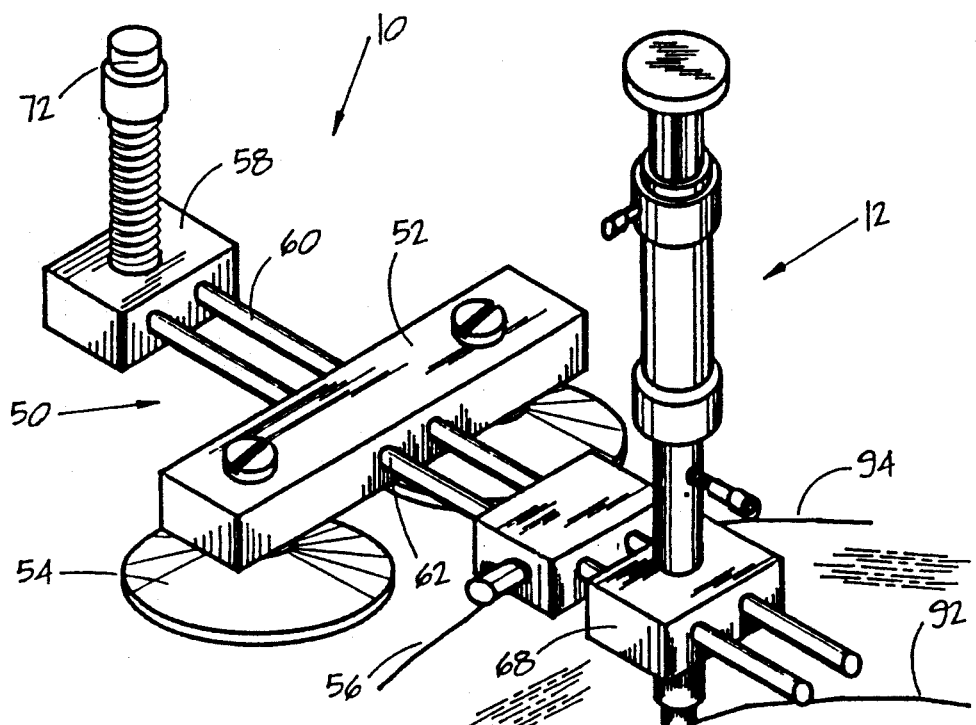
FIG. 1
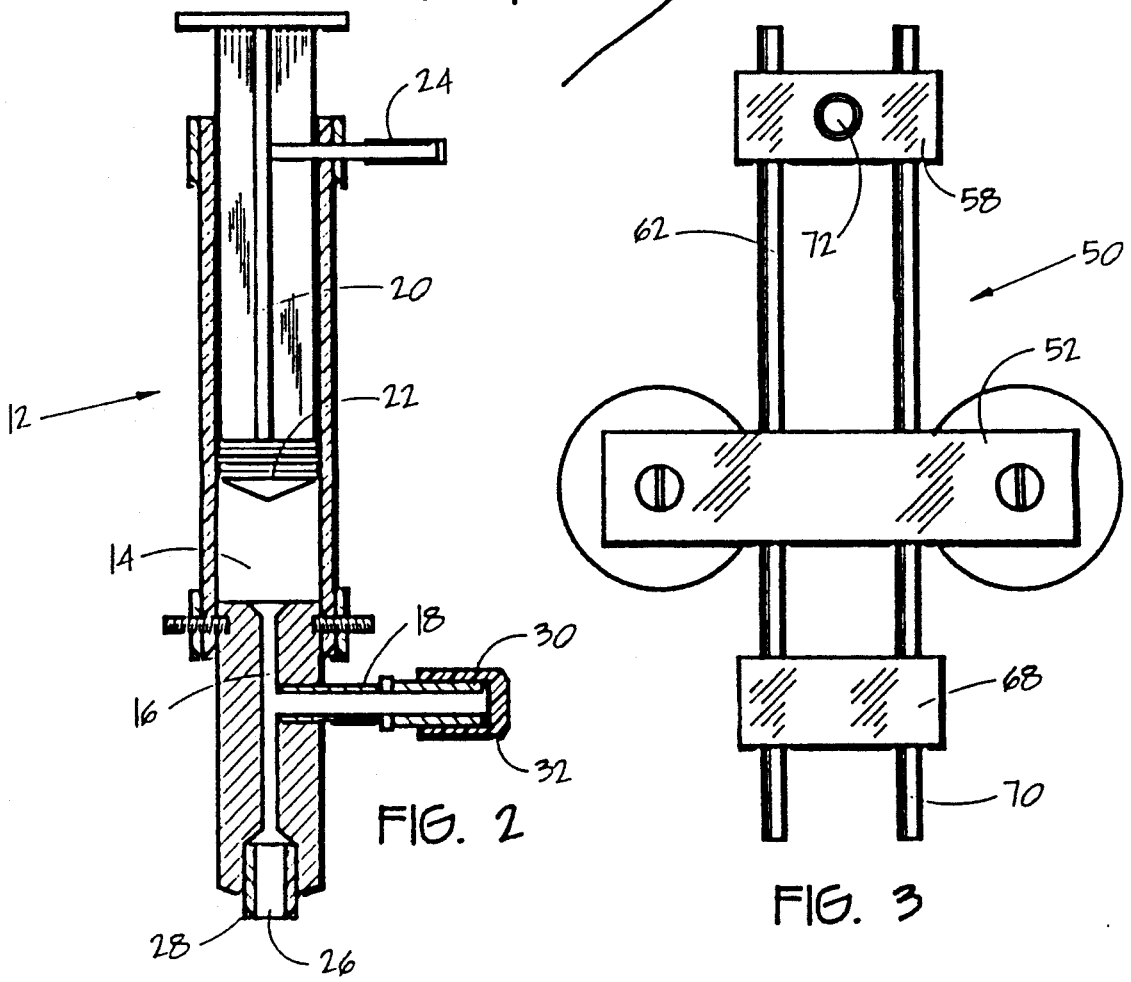
FIG. 2
FIG. 3

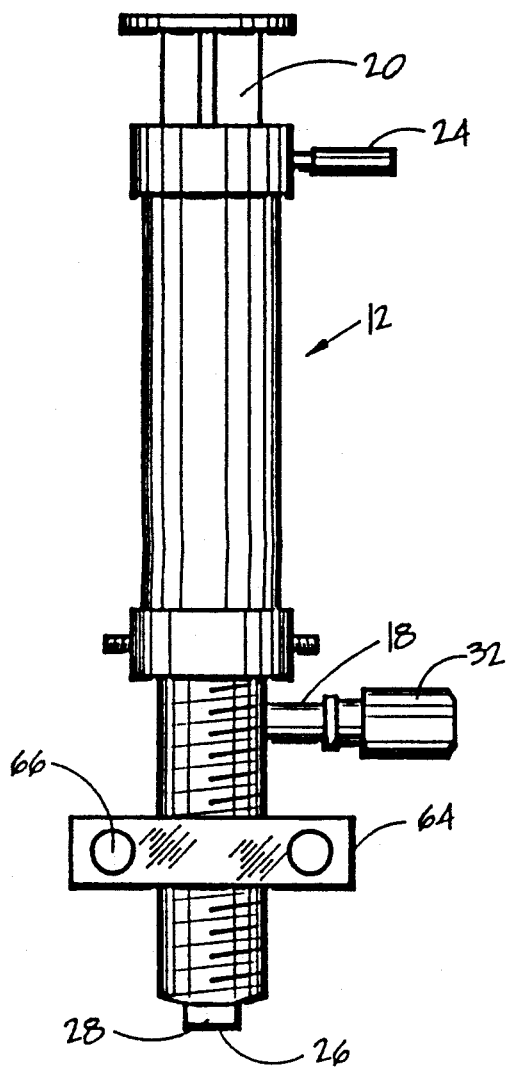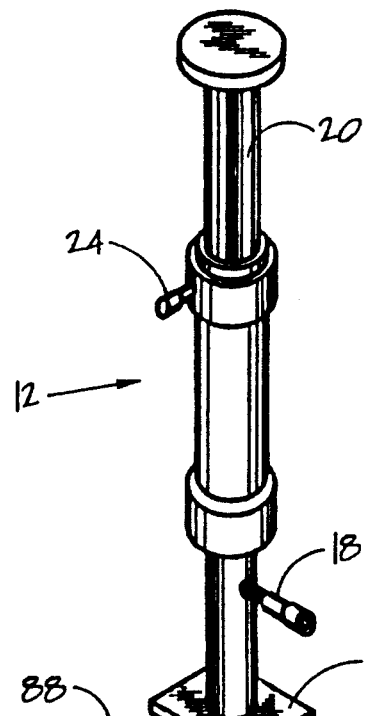
FIG. 4
FIG. 5

APPARATUS FOR WINDSHIELD GLASS REPAIR

BACKGROUND OF THE INVENTION

This invention relates to apparatus for repairing cracks in windshield glass. Windshields generally are comprised of an inner glass layer, an intermediate sheet of transparent plastic material, and an outer galss layer. A typical windshield crack is visible because of the air that is trapped in the crack in the outer glass layer. Repair is traditionally effected by replacing the air with a resin filler material or the like.

There exist devices for removing the air from cracks and subsequently injecting filler material into the crack. The problem exists in providing a steady and continuous supply of filler material so that the device can repair a crack of substantial length. Whenever the device has to be removed from the crack to add filler material, the air-tight seal around the crack is lost, and air re-enters the crack. Because these devices must be pre-loaded with material prior to being applied to the crack, only a relatively small amount of filler can be applied before the device runs out.

Most of the windshield devices have suction cups for attachment to the windshield. Suction cups, however, lose their effectiveness if they are placed over a crack, because a vacuum seal will not be attained if air can leak from around the crack. If a crack to be repaired is positioned such that the suction cup supports of the device fall over an adjacent crack, stabilization of the device on the windshield at that point will be difficult, and an airtight seal over the crack to be repaired will be difficult to achieve.

SUMMARY OF THE INVENTION

By means of the instant invention there is provided an apparatus for windshield glass repair which allows for achieving a tight seal for evacuation of air from a crack and, at the same time, continuously dispensing resin filler material for injecting into the crack without having to remove the device from its tight seal with the crack.

The invention is comprised of a two-chambered cylinder having a piston plunger slidably disposed within the upper chamber. The bottom end of the lower chamber has sealing means for attaining an airtight seal over a crack to be repaired. Mounting means are provided to hold the cylinder in place over a crack. Once a seal is made over a crack, air is drawn out by withdrawing the plunger. A side port stem is provided in the lower chamber for the introduction of resin filler material into the cylinder and on to the crack. The side port also acts as a pressure and vacuum release. The filler material is injected into the crack by depressing the plunger.

Because the side port allows for the introduction of filler material, the cylinder does not have to be removed to add more material during the repair of longer cracks. The tight seal can be maintained and, therefore, a crack of any length can be repaired. The mounting means has suction cups for attachment to the windshield, which allows the entire apparatus to be slid along a crack.

The mounting means of the instant invention is adapted to receive the cylinder in a quick connect/disconnect manner. The cylinder receives a mounting member which attaches to a mating area on the mounting means. By this arrangement, the cylinder can be slipped on and off, rather than screwed into the mounting means as is conventionally done. This makes maintenance and cleaning of the cylinder between crack operations much more efficient.

It is therefore an object of the invention to provide a windshield repair apparatus which can continuously receive a supply of resin filler material closely following the evacuation process without disturbing the tight seal maintained by the device over the crack so that cracks of any length can be repaired.

It is further an object of the invention to provide mounting means for the repair apparatus which allows for increased adjustability with respect to positioning of the cylinder along cracks on the windshield.

It is still further a object of the invention to provide a windshield repair apparatus which is equipped with quick connect/disconnect means for attachment to the mounting means.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWINGS

FIG. 1 is a perspective view of the windshield repair apparatus as attached to a windshield.

FIG. 2 is a cross-sectional view in side elevation of the pump column.

FIG. 3 is a top plan view of the first embodiment of the mounting means without the pump column attached.

FIG. 4 is a view in side elevation of the pump column with a mounting member attached.

FIG. 5 is a perspective view showing a second embodiment of the mounting means.

DESCRIPTION OF THE INVENTION

The windshield repair apparatus of the instant invention is generally indicated by the reference numeral 10 as is seen most clearly in FIG. 1. It is comprised of pump column 12 and mounting means 50.

Pump column 12 is comprised of a two-chambered cylinder, as best seen in FIG. 2. Top chamber 14 has a considerably larger diameter than bottom chamber 16 and the two are in fluid communication with each other. Bottom chamber 16 has a side port for receiving conduit, or stem, 18. Top chamber 14 is open at its upper end for receiving plunger 20. Piston head 22 closely engages the side walls of top chamber 14 forming an airtight seal and is slidable along the length of the chamber. Withdrawal of the plunger 20 will thus create a vacuum within the chambers. Stop means 24 are provided to retain plunger 20 at a set position. Stop 24 can be a set screw, or alternatively, a retaining pin for insertion in serially aligned holes (not shown).

Bottom chamber 16 is open at its lower end 26. Sealing means 28, such as a gasket or O-ring, is provided therein. Conduit 18 is in fluid communication with bottom chamber 16 and has an opening to the atmosphere at end 30, which receives sealing cap 32.

The first embodiment of the mounting means used in connection with the windshield repair apparatus of the instant invention is generally indicated by the reference numeral 50 and is shown in FIGS. 1 and 3. It is comprised of a base support member 52, having suction cups 54 for attachment to windshield 56, a levelling slide member 58, and guide rods 60. Levelling slide member 58 is connected at one end of the guide rods 60 while base support member 52 has apertures 62 for receiving rods 60 in sliding relation. Levelling slide 58 may also slide along guide rods 60 and has means, such as set screws, for being secured in position. A guide rod receiving member 64 is removably attached to pump column 12 to enable it to be mounted to mounting means 50 in quick connect/disconnect fashion. Pump column 12 and receiving member 64 may be threadedly engaged as shown in FIG. 4. Receiving member 64 has holes 66 spaced to receive guide rods 60. Spacer member 68 is fixedly connected towards the free ends of guide rods 60, leaving rod extensions 70 upon which receiving member 64 is mounted. The spacer member 68 is desirable when a plurality of guide rods are used. It is to be understood that a single guide rod member may be used to achieve the same objective of providing length adjustability to the mounting means. Levelling slide member 58 receives levelling screw 72 in threaded relation. Screw 72 can be adjusted accordingly to pivot guide rods 60 to force mounted pump column 12 down on a crack for a tighter seal.

A second embodiment of the mounting means is generally indicated by the reference numeral 80 and is shown in FIG. 5. It is comprised of a planar member 82 having suction cups 84 for attachment to the windshield. One end of planar member 82 has a hole for receiving levelling screw 86, and another end has a notch area 88. A retaining member 90 is connected to pump column 12 in threaded engagement and is dimensioned to fit within notch area 88 in tight fitting relation. This arrangement allows for quick connect/disconnect attachment of pump column 12 to the mounting means. Sealing of the crack is then effected a with the first embodiment of the mounting means.

USE

The windshield repair apparatus of the instant invention is able to repair cracks of any length. Apparatus 10 is positioned on a windshield through the suction cup attachments in near proximity to the crack 92 to be repaired as shown in FIG. 1. Opening 26 of pump column 12 is placed over the crack at its beginning point, with plunger 20 being fully depressed within top chamber 14. Leveling screw 72 is adjusted, as is understood by those skilled in the art, such that sealing means 28 creates a tight seal against the crack 92. After a tight seal is ensured, plunger 20 is withdrawn to create a vacuum within the two chambers so that air will be extracted from the crack. Plunger 20 is held in place by stop means 24 to sustain the vacuum effect. After several seconds, the vacuum is released by opening cap 32 which equalizes the pressure inside the chambers to that of the atmosphere. Plunger 20 is then depresses so that piston head 22 is positioned half way down the length of top chamber 14. Resin filler material is then introduced into bottom chamber 16 through opening 30 of stem 18. Cap 32 is subsequently sealed so that pressure can be generated within the pump column by depressing plunger 20. The pressure forces the resin filler down into the crack.

If air bubbles remain in the crack, sealing cap 32 is removed so that plunger 20 can be pushed all the way down into top chamber 14. Excess air is expelled to the atmosphere. Cap 32 is then replaced, and then plunger 20 is again withdrawn thus creating a vacuum to draw the remaining air out of the crack. As is understood by those skilled in the art, the air will be drawn out while the resin will remain in the crack. Cap 32 is again removed to release the vacuum and then plunger 20 is pushed back down to about the half way point in top chamber 14. Cap 32 is replaced and then plunger 20 is again depressed so that more resin filler can be forced into the crack. If more resin is needed, cap 32 is simply removed so that resin can be inserted through opening 30. The entire operation can be done without breaking the seal of pump column 12 upon the crack. Therefore, the apparatus can repair a crack the full length of the windshield or just a small crack. The pump cylinder can be moved along the crack by pushing the mounting means along the windshield as necessary.

Mounting means 50 is an adjustable mount which enables the distance between the pump column 12 and the suction cups attachments 54 to vary. This is useful in situations where a crack 94 is substantially adjacent to the crack 92 to be repaired, such as shown in FIG. 1. The suction cup will not adhere to the windshield over a crack because a tight seal can not be achieved. Therefore, the suction cups must be moved away from the interfering crack to a clear position on the windshield. Guide rods 60 allow for variable adjustment with respect to the distance between base support 52, levelling slide member 58, and spacer member 68. Thus, the effective length of the mounting means can be changed to avoid placement of the suction cups over cracks, and according to the particular job required, whether it be on the middle of the windshield, or edge or corner of the windshield. It is also possible to repair cracks in side view mirrors.

Pump column 12 is quickly attachable to mounting means 50 by way of receiving member 64 which has apertures 66 for receiving guide rod extensions 70. When a particular job is finished, it is a simple matter to slide off pump column 12 for maintenance and cleaning in preparation for another crack. This greatly increases the efficiency and speed of crack repairing. Because pump column 12 and receiving member 64 are threadedly connected, pump column 12 may be rotated as necessary to arrange resin stem 18 in an accessible radial position for the loading of resin material.

Mounting means 80 also allows for quick connect and disconnect attachment of pump column 12. Retaining member 90 is press fitted into notch 88 of planar member 82 and is held therein by friction. Retaining member 90 is connected to pump column 12 in threaded engagement, thus resin stem 18 may be rotated as necessary for access when pump column 12 is mounted.

Various changes and modifications may be made within this invention as will be apparent to those skilled in the art. Such changes and modifications are within the scope and teaching of this invention as defined in the claims appended hereto.

What is claimed is:

1. An apparatus for repairing a crack in a vehicle windshield, said apparatus comprising a two-chambered cylinder and mounting means for mounting said cylinder to said windshield, a top chamber being disposed above and in fluid communication with a bottom chamber within said cylinder, said top chamber having an open upper end for receiving a plunger, said plunger being slidably extendable within said top chamber and having a piston head in tight sealing relation with the walls of said top chamber, said bottom chamber having an opening at a lower end thereof, said opening being provided with sealing means, said bottom chamber further having a second opening disposed along a side thereof, said second opening receiving a stem, said stem comprising a conduit in communication with said bottom chamber, said stem having an outlet at a distal end thereof, sealing means for selectively opening and closing said outlet, said mounting means being engageable with said windshield, whereby said cylinder is mounted to said mounting means such that said opening of said bottom chamber is positioned over and in sealing relation with said crack, whereby withdrawal of the plunger creates a vacuum within said cylinder thereby extracting air from said crack, whereby air pressure within said chambers is equalized with that of the atmosphere by opening said outlet, whereby filler material is introduced through said outlet and into said bottom chamber, whereby upon closing of said outlet, depression of said plunger increases the air pressure within said cylinder thereby forcing said filler material into said crack said mounting means comprising a base support having suction cup attachments for adhering to said windshield, a leveling slide member having a leg for engaging said windshield and to provide stability to said mounting means, a pair of guide rods, and a guide rod receiving member, said base support, leveling slide member, and receiving member each having a pair of apertures for receiving said guide rods such that said guide rods are disposed in parallel relation to each other, said leveling slide member being connected at one end of said guide rods, a second end of said guide rods projecting beyond said base support, said guide rods being slidable within said base support whereby relative distance between said base support and said levelling slide member is adjustable, said receiving member being connected to said cylinder whereby said cylinder and said receiving member are mounted on an extension of each of said guide rods at said second end thereof, relative distance between said cylinder and said base support being adjustable by sliding said guide rods within said base support, whereby said cylinder is moveable along said crack as said mounting means is moved along said windshield.

2. The apparatus of claim 1 in which locking means are provided for retaining said plunger in a retracted position.

3. The apparatus of claim 1 in which said leveling slide member is slidable along said guide rods whereby said leveling slide member is moveable within close proximity to said base support.

4. The apparatus of claim 1 in which said leg of said leveling slide member is adjustable, whereby increased stability is imparted to said mounted cylinder in relation to said windshield.

5. The apparatus of claim 1 in which said cylinder is externally threaded along a portion of said bottom chamber, and said guide rod receiving member has a threaded opening, whereby said receiving member is connected to said cylinder in threaded engagement.

6. The apparatus of claim 5 in which said cylinder is rotatable about a retaining member when mounted on said mounting means whereby said side stem is positioned in any radial direction.

7. The apparatus of claim 1 in which a spacer member is connected on said guide rods towards said second end, whereby said extensions of said guide rods are maintained in parallel relation preparatory to mounting said cylinder.

8. An apparatus for repairing a crack in a vehicle windshield, said apparatus comprising a two-chambered cylinder and mounting means for mounting said cylinder to said windshield, a top chamber being disposed above and in fluid communication with a bottom chamber within said cylinder, said top chamber having an open upper end for receiving a plunger, said plunger being slidably extendable within said top chamber and having a piston head in tight sealing relation with the walls of said top chamber, said bottom chamber having an opening at a lower end thereof, said opening being provided with sealing means, said bottom chamber further having a second opening disposed along a side thereof, said second opening receiving a stem, said stem comprising a conduit in communication with said bottom chamber, said stem having an outlet at a distal end thereof, sealing means for selectively opening and closing said outlet, said mounting means being engageable with said windshield, whereby said cylinder is mounted to said mounting means such that said opening of said bottom chamber is positioned over and in sealing relation with said crack, whereby withdrawal of the plunger creates a vacuum within said cylinder thereby extracting air from said crack, whereby air pressure within said chambers is equalized with that of the atmosphere by opening said outlet, whereby filler material is introduced through said outlet and into said bottom chamber, whereby upon closing of said outlet, depression of said plunger increases the air pressure within said cylinder thereby forcing said filler material into said crack said mounting means comprising a support plate and a leveling screw, said support plate being planar and having a suction cup attachment for adhering to said windshield, said leveling screw being disposed transversely through said support plate at an end thereof, said leveling screw being adjustable for engaging said windshield to provide stability to said mounting means, another end of said support plate having a notched area, said cylinder receiving a retaining member on said bottom chamber, said retaining member having a dimension slightly greater than an inside dimension of said notched area, whereby said retaining member is received within said notched area in tight fitting relation.

9. The apparatus of claim 8 in which said cylinder is externally threaded along a portion of said bottom chamber, and said retaining member has a threaded opening, whereby said retaining member is connected to said cylinder in threaded engagement.

10. The apparatus of claim 8 in which said cylinder is rotatable about said retaining member when mounted on said mounting means whereby said side stem is positioned in any radial direction.

11. The apparatus of claim 8 in which locking means are provided for retaining said plunger in a retracted position.

* * * * *